United States Patent
Bhagavathy et al.

(10) Patent No.: US 8,204,334 B2
(45) Date of Patent: Jun. 19, 2012

(54) ADAPTIVE PIXEL-BASED FILTERING

(75) Inventors: Sitaram Bhagavathy, Plainsboro, NJ (US); Joan Llach, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 842 days.

(21) Appl. No.: 12/308,914

(22) PCT Filed: Jun. 29, 2006

(86) PCT No.: PCT/US2006/025738
§ 371 (c)(1),
(2), (4) Date: Dec. 29, 2008

(87) PCT Pub. No.: WO2008/005007
PCT Pub. Date: Jan. 10, 2008

(65) Prior Publication Data
US 2009/0278988 A1    Nov. 12, 2009

(51) Int. Cl.
*G06K 9/40* (2006.01)
*H04N 5/00* (2011.01)
*G09G 5/10* (2006.01)
*G09G 5/02* (2006.01)
*G09G 5/00* (2006.01)

(52) U.S. Cl. ........ 382/261; 382/274; 382/275; 348/607; 345/690; 345/597; 345/616; 345/611; 345/596

(58) Field of Classification Search .................. 382/261, 382/274, 275; 348/607, E5.022
See application file for complete search history.

(56) References Cited

U.S. PATENT DOCUMENTS

| 5,191,419 A | 3/1993 | Wischermann |
| 5,210,609 A | 5/1993 | Yu |
| 5,703,965 A * | 12/1997 | Fu et al. ........................ 382/232 |
| 5,717,463 A | 2/1998 | Brailean et al. |

(Continued)

FOREIGN PATENT DOCUMENTS

| CN | 1674633 | 9/2005 |

(Continued)

OTHER PUBLICATIONS

Wang, et al., "A Novel Adaptive Pixel Decimation for Block Motion Vector Estimation", IEICE Trans. Commun., vol. E82-B, No. 1, Jan. 1999.

(Continued)

*Primary Examiner* — Michelle Entezari
(74) *Attorney, Agent, or Firm* — Robert D. Shedd; Paul P. Kiel; Brian J. Dorini

(57) ABSTRACT

In an implementation, a pixel is selected from a target digital image. Multiple candidate pixels, from one or more digital images, are evaluated based on values of the multiple candidate pixels. For the selected pixel, a corresponding set of pixels is determined from the multiple candidate pixels based on the evaluations of the multiple candidate pixels and on whether a predetermined threshold number of pixels have been included in the corresponding set. Further for the selected pixel, a substitute value is determined based on the values of the pixels in the corresponding set of pixels. Various implementations described provide adaptive pixel-based spatio-temporal filtering of images or video to reduce film grain or noise. Implementations may achieve an "even" amount of noise reduction at each pixel while preserving as much picture detail as possible by, for example, averaging each pixel with a constant number, N, of temporally and/or spatially correlated pixels.

30 Claims, 7 Drawing Sheets

U.S. PATENT DOCUMENTS

| | | | |
|---|---|---|---|
| 6,335,990 B1 * | 1/2002 | Chen et al. | 382/261 |
| 6,339,616 B1 | 1/2002 | Kovalev | |
| 6,476,824 B1 * | 11/2002 | Suzuki et al. | 345/690 |
| 6,567,750 B1 * | 5/2003 | Nadon et al. | 702/19 |
| 6,731,806 B1 | 5/2004 | Gindele | |
| 6,907,144 B1 * | 6/2005 | Gindele | 382/275 |
| 7,116,837 B2 | 10/2006 | Nakajima et al. | |
| 7,729,555 B2 * | 6/2010 | Chen et al. | 382/261 |
| 7,834,887 B2 * | 11/2010 | Xu et al. | 345/597 |
| 8,115,781 B2 * | 2/2012 | Chen et al. | 345/616 |
| 2002/0005904 A1 | 1/2002 | Mendis | |
| 2002/0028025 A1 | 3/2002 | Hong | |
| 2002/0150166 A1 * | 10/2002 | Johnson | 375/240.29 |
| 2003/0118214 A1 | 6/2003 | Porikli | |
| 2003/0156301 A1 | 8/2003 | Kempf et al. | |
| 2003/0228067 A1 * | 12/2003 | Miyake et al. | 382/275 |
| 2004/0233333 A1 | 11/2004 | Chiu et al. | |
| 2005/0232487 A1 * | 10/2005 | Fleisher | 382/181 |
| 2005/0248687 A1 * | 11/2005 | Lee et al. | 348/606 |
| 2005/0286758 A1 * | 12/2005 | Zitnick et al. | 382/154 |
| 2006/0088274 A1 * | 4/2006 | Choi et al. | 386/2 |

FOREIGN PATENT DOCUMENTS

| | | |
|---|---|---|
| EP | 0961224 | 12/1999 |
| EP | 1100260 | 5/2001 |
| EP | 1133162 | 12/2001 |
| EP | 1174824 | 1/2002 |
| EP | 1324590 | 7/2003 |
| EP | 1365574 | 11/2003 |
| EP | 1617645 | 1/2006 |
| EP | 1720354 | 11/2006 |
| GB | 2264414 | 8/1993 |
| JP | 6-86104 | 3/1994 |
| JP | 10-262160 | 9/1998 |
| JP | 2001-143068 | 5/2001 |
| JP | 2002-259965 | 9/2002 |
| JP | 2003-179779 | 6/2003 |
| TW | 576103 | 2/2004 |
| WO | WO9409592 | 4/1994 |
| WO | WO02/05213 | 1/2002 |
| WO | WO2004021303 | 3/2004 |
| WO | WO2005079072 | 8/2005 |
| WO | WO2005079077 | 8/2005 |
| WO | 2006/033084 A2 | 3/2006 |

OTHER PUBLICATIONS

He, et al., "Low-Power VLSI Design for Motion Estimation Using Adaptive Pixel Truncation", IEEE Transactions on Circuits and Systems for Video Technology, vol. 10, No. 5, Aug. 2000.

Kim, et al., Bi-Level Digital Video Coding, IEICE Trans. Commun., vol. E87-B, No. 3, Mar. 2004.

Lee, J-S., "Digital Image Smoothing and the Sigma Filter", computer Vision, Graphics, and Image Processing 24, pp. 255-269, 1983.

Ojo, et al., "An Algorithm for Integrated Noise Reduction and Sharpness Enhancement", IEEE Transactions on Consumer Electronics, vol. 46, No. 3, Aug. 2000, XP2194412.

Ojo, et al., "Integrated Spatio-Temporal Noise Reduction With Implicit Motion Compensation", 2001 IEEE, XP-002194413.

Rajagopalan, et al.,. "Motion Field Modeling for Video Sequences", IEEE Transactions on Image Processing, vol. 6, No. 11, Nov. 1977.

Starck, et al., "The Curvelet Transform for Image Denoising", IEEE Transactions on Image Processing, vol. 11, No. 6, Jun. 2002.

Thornberg, et al., Conceptual Interface and Memory-Modeling for Real-Time Image Processing Systems, 2002 IEEE, pp. 138-141.

Wang, et al., "A Globally Adaptive Pixel-Decimation Algorithm for Block-Motion Estimation", IEEE Transactions on Circuits and Systems for Vido Technology, vol. 10, No. 6, Sep. 2000.

Hassouni et al., "HOS-Based Image Sequence Noise Removal," IEEE Transactions on Image Processing, vol. 15, No. 3, Mar. 2006, pp. 572-581.

Ozkan et al., "Efficient Multiframe Wiener Restoration of Blurred and Noisy Image Sequences," IEEE Transactions on Image Processing, vol. 1, No. 4, Oct. 1992, pp. 453-476.

International Search Report, dated Jul. 18, 2007.

* cited by examiner

US 8,204,334 B2

ADAPTIVE PIXEL-BASED FILTERING

This application claims the benefit, under 35 U.S.C. §365 of International Application US2006/25738, filed on Jun. 29, 2006, which was published in accordance with PCT Article 21(2) on Jan. 10, 2008, in English.

TECHNICAL FIELD

This disclosure relates to image filtering.

BACKGROUND OF THE INVENTION

Video noise reduction filters have been extensively used in both post-production and video compression environments. The former often require filters which preserve as much detail as possible, and therefore tend to use very conservative settings which may lead to uneven noise removal over the picture. The latter often require high filtering strength, even at the expense of some loss in detail, because the goal is to reduce the amount of information in the video and thereby increase compression efficiency (that is, reduce bit rate).

Video filtering can be performed in the pixel domain or in a transform domain such as Fourier or wavelet. Pixel-based video filtering methods typically reduce noise by averaging each pixel with a number of other pixels. In pixel-based spatial filtering, these other pixels are usually spatial neighbors. Known techniques of pixel-based spatial filtering include median filters. In temporal filtering, these other pixels are typically temporally predicted pixels from n nearby reference frames. Previous pixel-based video filtering methods have combined spatial and temporal filtering in various ways.

SUMMARY

According to an implementation, a pixel is selected from a target digital image. Multiple candidate pixels, from one or more digital images, are evaluated based on values of the multiple candidate pixels. For the selected pixel, a corresponding set of pixels is determined from the multiple candidate pixels based on the evaluations of the multiple candidate pixels and on whether a predetermined threshold number of pixels have been included in the corresponding set. Further for the selected pixel, a substitute value is determined based on the values of the pixels in the corresponding set of pixels.

The details of one or more implementations are set forth in the accompanying drawings and the description below. Other aspects and features will become apparent from the following detailed description considered in conjunction with the accompanying drawings and the claims. It is to be understood, however, that the drawings are designed solely for purposes of illustration and not as a definition of the limits of the present principles. It should be further understood that the drawings are not necessarily drawn to scale and that, unless otherwise indicated, they are merely intended to conceptually illustrate particular structures and procedures.

DETAILED DESCRIPTION

One challenge is to create a video filtering method which addresses two major problems associated with video noise removal: (a) loss of detail in the content, and (b) filtering artifacts, that is, artifacts introduced by the filtering process such as uneven noise removal. The lack of interaction in prior art systems between spatial and temporal filtering at the pixel level causes the strength of the filtering to vary from pixel to pixel, thus leading to the possibility of post-filtering artifacts arising from uneven filtering.

An implementation addresses these problems by providing explicit interaction between spatial and temporal filtering. The explicit interaction is achieved by combining spatial and temporal filtering at the pixel level, while continuing to enforce an even amount of noise reduction across all pixels in a video and while keeping as much detail as possible. Each pixel is averaged with a constant number of temporally and spatially correlated pixels. Averaging each pixel with a constant number of other pixels may be particularly advantageous in the presence of additive noise, such as Gaussian noise, and is useful in the presence of other noise as well. Post-filtering artifacts are reduced or avoided by enforcing an even amount of noise reduction across all pixels in the video. The implementation thus combines spatial and temporal filtering at the pixel level. This provides a significant advantage over prior art systems that either: 1) do not have explicit interaction between spatial and temporal filtering at the pixel level, or 2) switch between spatial or temporal filtering at the pixel level.

Figure 1:
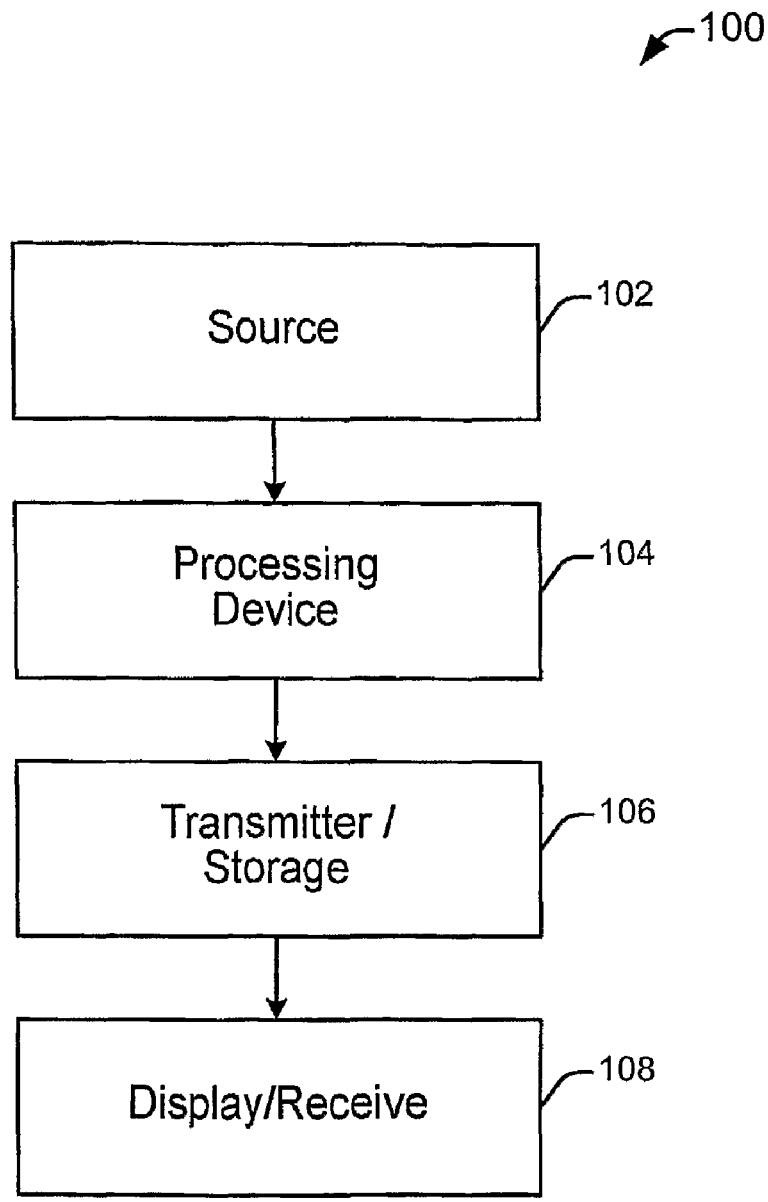
FIG. 1 is a block diagram of an implementation of a system for adaptive pixel-based spatio-temporal video noise filtering.

FIG. 1 shows a block diagram of a system 100. A source 102 of video information provides an input to a processing device 104. The processing device 104 conducts an adaptive pixel based spatio-temporal video noise filtering process, and passes the result to a transmitter and/or storage device 106 for transmission or storage. In the implementation shown, a display 108 receives the noise filtered video information from the transmitter 106 and operates to display the same. Those of skill in the art will recognize that display 108 can be replaced by other devices. For example, a receiver, such as a memory, can be adapted to receive the filtered video and, optionally, to pass the same on to other video processing devices.

Figure 2:
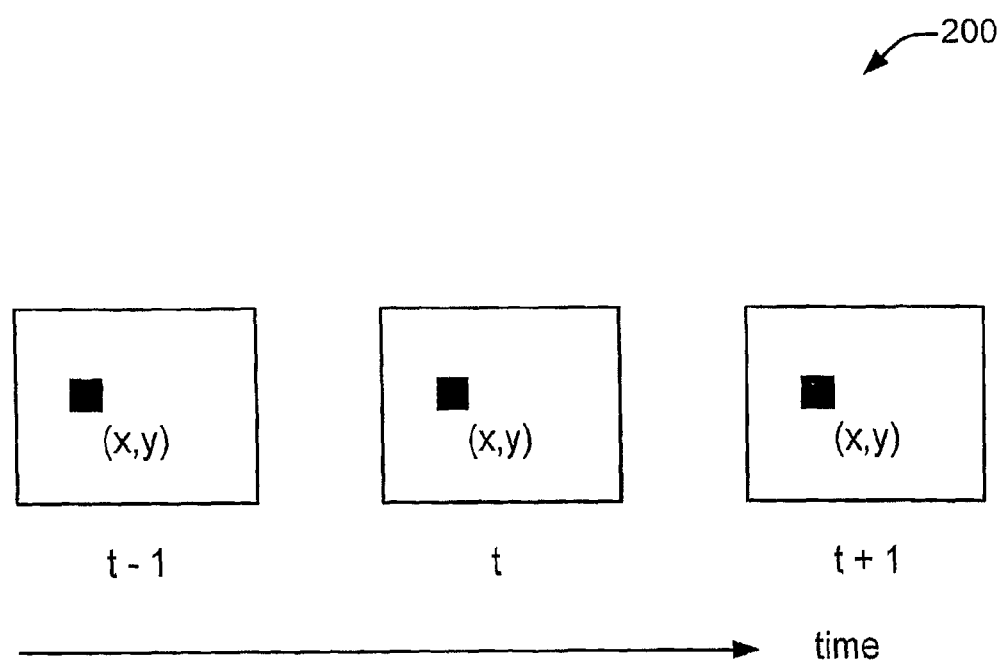
FIG. 2 is a block diagram of content provided by the source of FIG. 1 in an implementation.

FIG. 2 shows an exemplary diagrammatic representation of some source content 200 as provided by the source 102 to the processing device 104. The content is generated based on time and can be in the form of frames at a particular time t and the surrounding time based frames (for example, t−1, t+1, ... ). Each frame contains a set of pixels indexed by its spatial location (x, y) in the frame.

Figure 3:
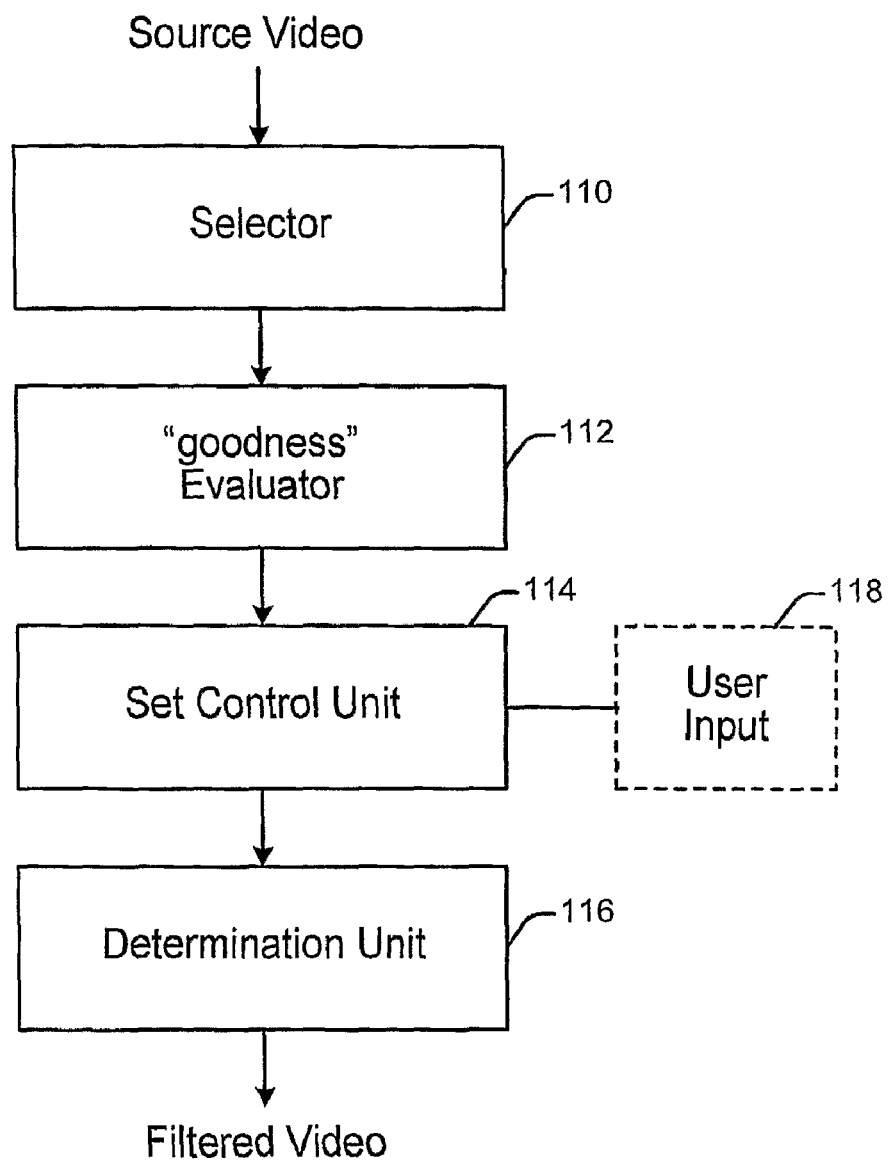
FIG. 3 is a block diagram showing an implementation of the processing device of FIG. 1.

FIG. 3 is a block diagram of an implementation of the processing device 104. The input to the processing device 104 is the source video, and the output is the filtered video. The implementation shown in FIG. 3 may perform a variety of processes for one or more pixels in the source video, resulting in a substitute (that is, filtered) value for each of those pixels.

Let the pixel for which the substitute value is being determined (or in other words, the pixel being filtered) be termed the current pixel and the frame it is drawn from, the current frame. For each current pixel, a selector 110 selects a set of candidate pixels from one or more reference frames. In one implementation, the reference frames are frames surrounding the current frame, and can also include the current frame itself. The selector 110 also may select the current pixel. An evaluator 112 determines a goodness value or quality metric of each pixel in the set of candidate pixels. According to various implementations, the goodness value or quality metric may be computed using, for example: 1) the color difference between a pixel and a selected candidate pixel; 2) the sum of absolute differences (SAD) between an M×N block around a pixel and an M×N block around a candidate pixel; or 3) the distance to the current pixel.

A set control unit 114 determines a corresponding set of pixels for the current pixel, based on the application of one or more criteria to the result of the evaluator 112. These criteria may determine: 1) whether or not one or more pixels from the candidate set, considered in a predetermined order, should be included in the corresponding set; and 2) when to stop including pixels from the candidate set in the corresponding set. The criteria for stopping the inclusion of the pixels from the candidate set in the corresponding set, in order of priority for one implementation, are: A) a predetermined number of pixels have been included in the corresponding set, or B) all the pixels in the candidate set have been considered. A determination unit 116 determines the substitute value for the current pixel based on the values of the pixels in the corresponding set.

A user input unit 118 is optionally included in the processing device 104, with the user input unit 118 being shown in FIG. 3 in a dashed box to further indicate that it is optional. The user input unit 118 may be used, for example, to allow a user to enter a stopping criteria such as a value of N where N may be the number of pixels included in the corresponding set of pixels for a current pixel. The user input unit 118 may be coupled to the set control unit 114 as shown in FIG. 3, or coupled (directly or indirectly) to one or more other components. In various implementations, the value of N may be, for example, fixed in software or hardware and not be adjustable by a user.

Figure 4:
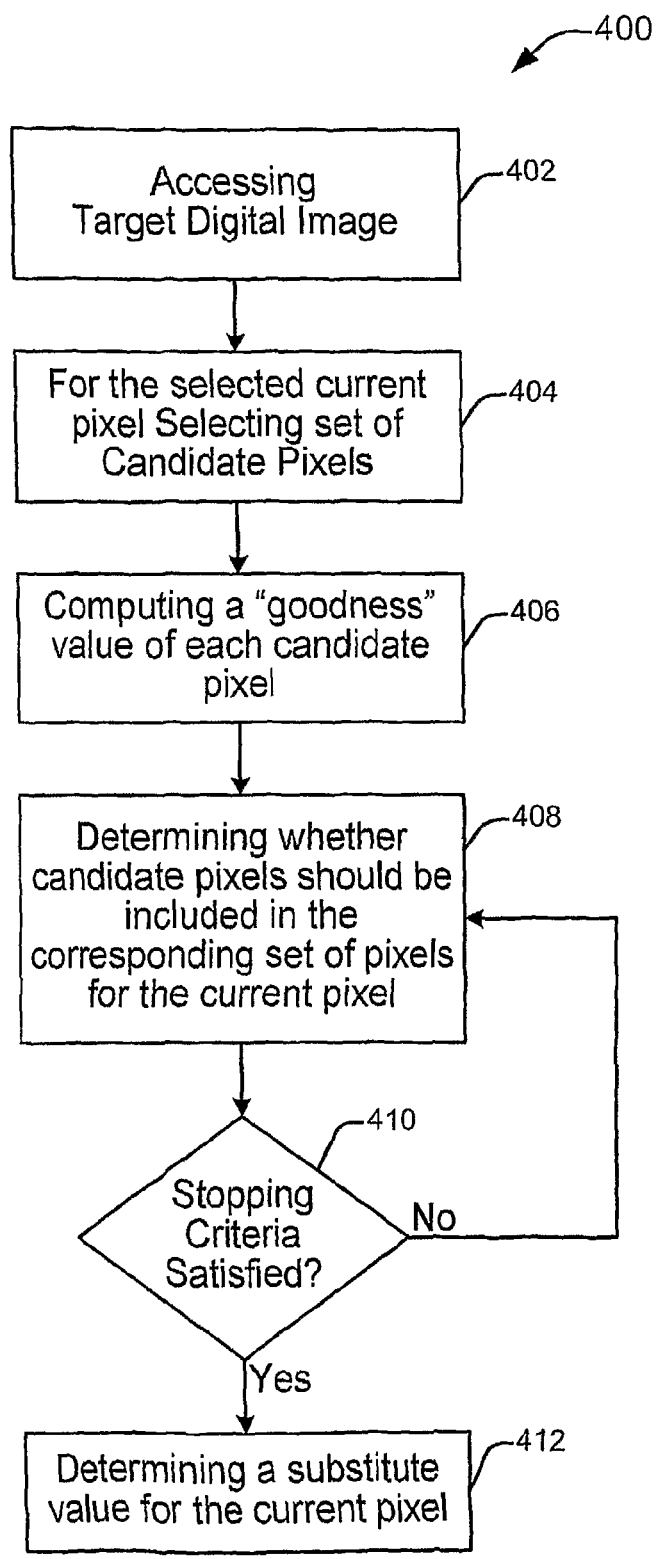
FIG. 4 is a flow chart showing an implementation of a method for video noise filtering using the system of FIG. 1.

FIG. 4 shows a flow diagram 400 of the processing according to an implementation. A target digital image of the source video is accessed 402 and a current pixel is selected. The source video of this implementation may include one or more of a variety of different video sources. The next operations 404-412 are performed for at least one pixel selected from the target image. For the selected current pixel, a set of candidate pixels are selected from one or more reference frames (which may or may not include the current frame) 404. Once a set of candidate pixels is selected, one or more goodness values (or quality metrics) of each candidate pixel is computed (406). At this point, a corresponding set of pixels for the current pixel is determined based on one or more criteria (408). The criteria may include, for example, whether the goodness value satisfies a threshold. Operation 408 may consider the one or more pixels from the candidate set in a predetermined order.

It is then determined whether a stopping criteria has been met (410). Again, as mentioned above, the stopping criteria can be, for example: A) a predetermined number of pixels have been included in the corresponding set; or, B) all the pixels in the candidate set have been considered. Once the stopping criteria is met, a substitute value for the current pixel is determined based on the values of the pixels in the corresponding set (412).

Figure 5:
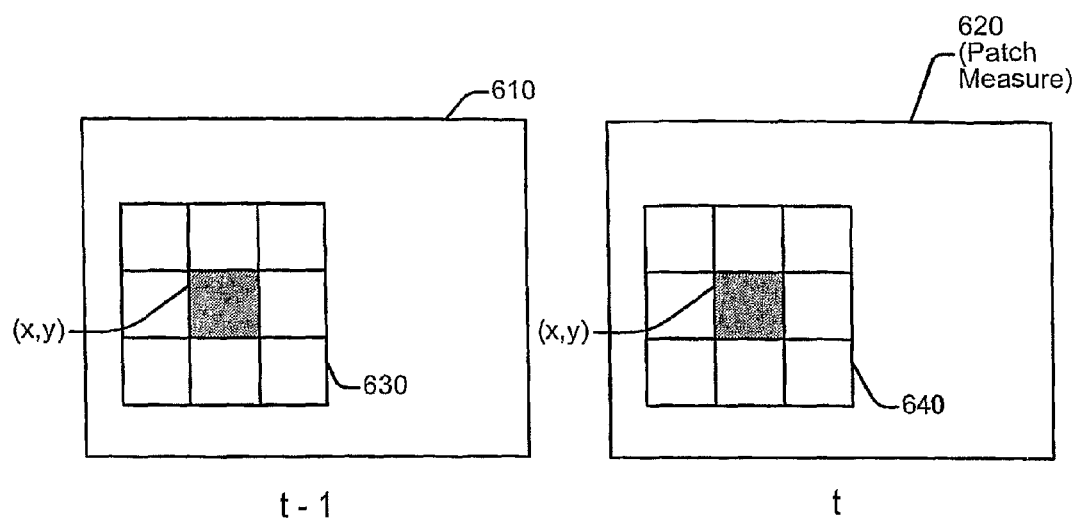
FIG. 5 is a diagrammatic representation of an implementation of a patch measure for determining good candidates.

Referring to FIG. 5, two adjacent frames 610 and 620 with 3×3 pixel patches 630 and 640, respectively, are shown. In accordance with an implementation, a patch based measure of "goodness" first computes the absolute differences between corresponding pixels in the two patches, and then sums these absolute differences to form a sum of absolute differences (SAD). The temporal predictor pred[j] is said to be "good" if the SAD between the pixels in the two patches is less than a predetermined threshold. Those of skill in the art will recognize that in practice, this threshold may be split into two thresholds, one for the SAD of the luma components of the pixels, and one for the SAD of the chroma components. It is important to note that: 1) the frames need not be adjacent (even though shown as adjacent in FIG. 5); and 2) the (x, y) locations of the pixels in the two frames need not be the same. One of ordinary skill in the art will be aware of various ways of selecting patches and thresholds.

Figure 6:
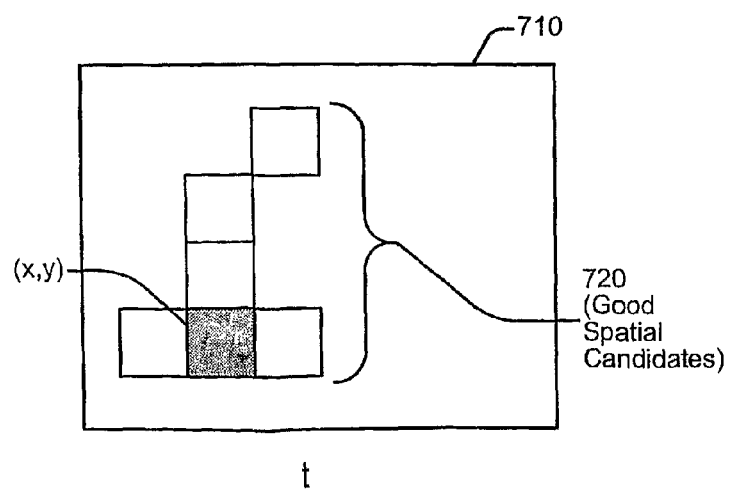
FIG. 6 is a diagrammatic representation of an implementation showing the selection of spatial candidates.

FIG. 6 is a diagrammatic representation showing a frame 710 with the current pixel (x, y) and the set of pixels 720 that have been chosen as "good" spatial candidates (that is, pixels in the spatial neighborhood that have "passed" the goodness criterion for spatial filtering). For example, one criterion is the difference between the values of the current pixel and the candidate pixel, and the difference may be compared to a threshold. If FIGS. 5 and 6 represent a set of pixels that pass the goodness test(s) for the temporal (FIG. 5) and the spatial (FIG. 6) domains, then N is equal to 15, reflecting 9 temporal pixels, 5 spatial pixels, and the target pixel.

Figure 7:
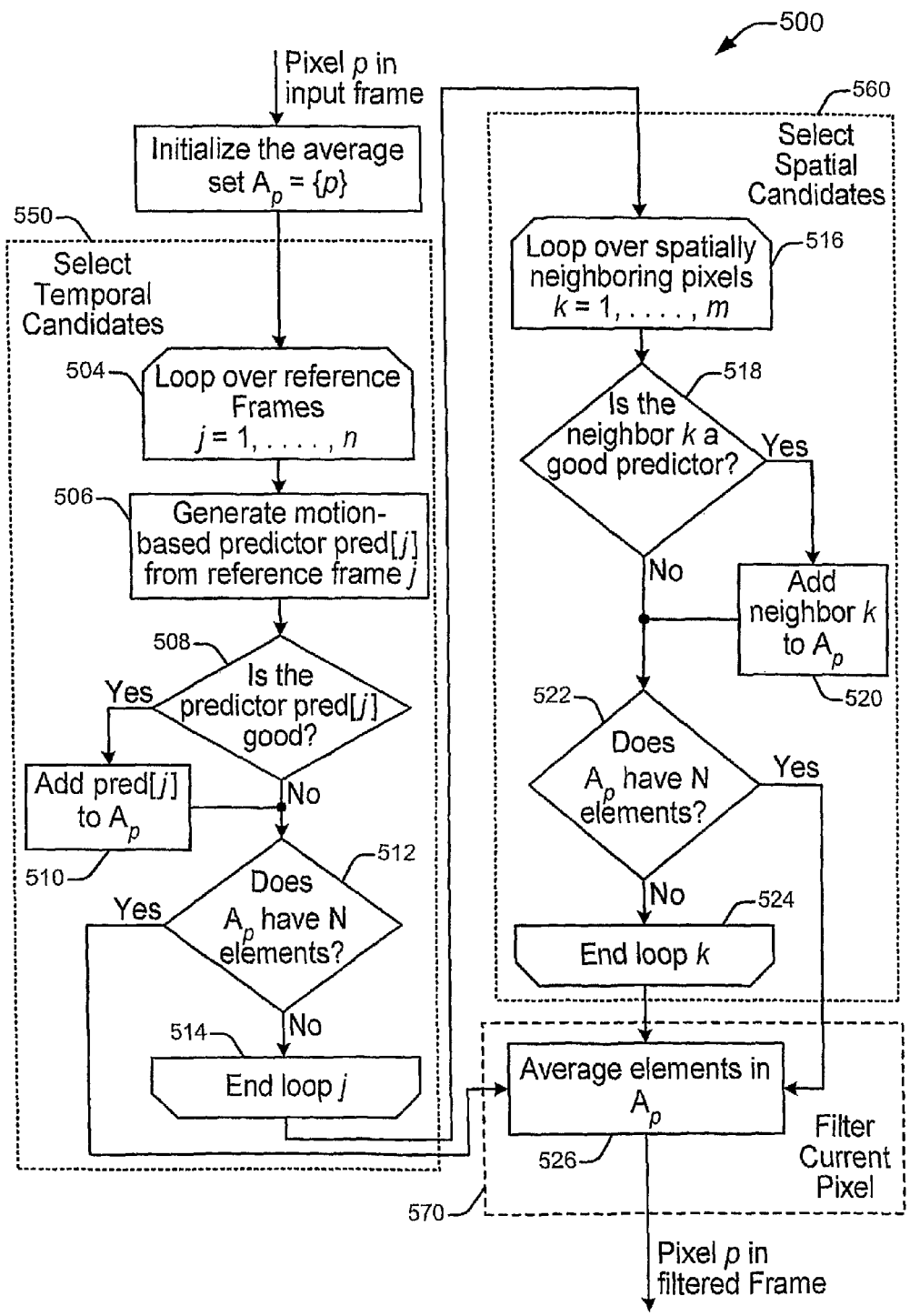
FIG. 7 is a flow chart showing an implementation of a method for adaptive pixel-based video noise filtering.

FIG. 7 shows a flowchart of a process 500 for adaptive spatio-temporal video noise filtering according to one implementation. For filtering each pixel p in the input video frame, the goal of the process 500 is to find N "good" candidates for averaging p with (including itself), where N is a constant throughout the filtering process 500. These "good" candidates are put in an averaging set $A_p=\{p, c_i; i=1, \ldots, M\}$, where $M \leq N-1$, and $M < N-1$ only when enough "good" candidates are unavailable. The filtering process then involves replacing p by the average of the elements of $A_p$. Note, as used herein, the phrase "averaging pixels" refers to averaging the luma and chroma component values of the pixels separately (for example, Y, U, and V), although implementations need not perform the averaging separately. For implementations that do perform averaging separately on components, various other operations (or even the entire process) will typically or necessarily also be performed separately on the components.

In the process 500, the N "good" candidates may be chosen from the temporal or the spatial domain. According to one implementation, the N "good" candidates are first sought in the temporal domain since temporal filtering is less likely to blur visual details. As shown in FIG. 7, the process 500 includes three primary aspects: the selection of temporal candidates 550; the selection of spatial candidates 560; and the filtering by averaging the selected candidates 570. The process 500 filters each pixel using candidates selected from the temporal and/or spatial domains. This is contrary to various prior art methods that filter a whole frame at once, either spatially or temporally, and combine the results to provide the filtered frame.

Referring to FIG. 7, and in accordance with one implementation of the present principles, the selection of temporal candidates 550 first involves estimating the motion of pixel p from the current frame to n reference frames. As shown, a pixel p from an input frame is used to initialize the averaging set $A_p=\{p\}$ (502). A loop over reference frames j=1, ..., n (504) is performed and the motion based predictor pred[j] is generated from the reference frame j (506). Thereafter, each temporally predicted pixel pred[j] (from the $j^{th}$ reference frame) is considered in turn as a candidate for $A_p$ (508). If it is determined to be a "good" predictor (that is, passes the quality metric criteria), it is added to the set $A_p$ (510). In the course of choosing temporal candidates, if $|A_p|=N$ (that is, the number of elements in $A_p$ equals N) at 512, the process of seeking candidates is terminated, and we move on to the filtering step 570.

Figure 8:
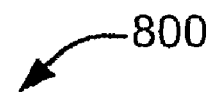
FIG. 8 is a diagrammatic representation of an implementation showing a 5×5 grid of spatially neighboring pixel candidates in the spatial filtering of a pixel p.

If, after selecting candidates from the temporal domain, $|A_p|<N$, the end loop j occurs (514), and we start looking for candidates in the spatial domain. One possibility is that we consider all pixels in a b×b neighborhood of p, as shown in FIG. 8. One of ordinary skill will be aware of various techniques for selecting the size of a neighborhood. The order in which we consider the spatial neighbors in the loop k=1, . . . m (516) is determined by the proximity of the candidate pixel to p. If the candidate neighboring pixel is determined to be "good," (518) it is added to $A_p$. If $|A_p|=N$ (522) while scanning spatial candidates, or all candidates have been scanned, we proceed to the filtering step 570.

Finally, in the filtering step 570, pixel p is replaced by the average (526) of the elements of $A_p$ and the process moves on to the next pixel to be filtered. Other operations in lieu of, or in addition to, averaging may be used to determine a replacement for the pixel p. More generally, an implementation may determine a replacement based on the values of the pixels in $A_p$, including but not limited to an average of those values. It should be clear that although the number N typically remains constant for each pixel in a target digital image, the relative locations of the N pixels may change for each pixel in the target digital image.

FIG. 8 shows a numbering 800 of a set of candidate pixels around a current pixel p. The numbering 800 assigns a number to the neighboring pixels based on spatial distance from, or spatial proximity to, the current pixel p. The four pixels labeled "1" have a common distance to p and are the closest to p. The four pixels labeled "2" have a common distance to p and are the second closest to p. The four pixels labeled "3" have a common distance to p and are the third closest to p. The eight pixels labeled "4" have a common distance to p and are the fourth closest to p. The four pixels labeled "5" have a common distance to p and are the fifth closest to p. The numbering 800 may be used to determine which pixels to test first while building the corresponding set of pixels for p. For example, an implementation considers all "1" pixels, then all "2" pixels, then all "3" pixels, then all "4" pixels, and then all "5" pixels until the corresponding set has N pixels. This is in contrast, for example, to considering all pixels in a raster order such as left to right and top to bottom.

The "distance" approach of FIG. 8 may be applied to temporal candidates in other frames as well. One implementation uses a "temporal distance," rather than the spatial distance of FIG. 8, and "temporal distance" may be replaced with "frame distance" in an implementation that uses frames. For example, for current pixel p in frame j, an implementation considers first pred[j−1] (the prediction for p in frame j−1), then pred[j+1], then pred[j−2], then pred[j+2], etc., in an order of increasing frame distance.

Implementations may evaluate candidate pixels in the spatial domain prior to, or to the exclusion of, evaluating candidate pixels in the temporal domain. Other domains also may be used. Such other domains may include, for example, transform domains (for example, Fourier, wavelet), and domains taken from a separate recording of the same image(s). For example, in one implementation involving video taken from film reels, domains are extracted from the same video digitized from a different film reel. The other film reel may be particularly useful if the other film reel has similar film grain (noise, more generally) characteristics as a first film reel.

Implementations may include filtering video, or filtering a still image.

The selection of "N" may be based on the amount of noise that is desired to be removed. "N" may vary, for example, for different frames (for example, N may be set for a given sequence of frames covering a scene), for different regions within a frame, and for different components or separations (for example, luminance may have a different "N" than chrominance, or different color separations such as R, G, and B or Y, U, and V may have different values of "N").

Further, a user may select N based on experience, and an implementation may allow the user to enter a value for N using a user interface. The user interface may include, for example, a mechanical device (for example, a switch or a knob), a computer device (for example, a keyboard or a mouse, in possible cooperation with a pull-down menu or a display of the selected value), or a voice input system.

A user may select one or more values for the size of a corresponding pixel set. The one or more values may be a range, for example, with closed or open ends. Examples include, (i) N plus or minus X, (ii) greater than N, and (iii) less than N, where N and X are fixed. In various implementations in which the size is selected (or hard-coded) as "greater than N," as long as there are N pixels in the corresponding set, then the corresponding set may be considered complete. For various implementations having a maximum for the number of pixels that can be in a corresponding set of pixels, a user may select (or a system may have hard-coded) a predetermined maximum number for the number of pixels that may be included in a corresponding set of pixels.

Many implementations use a predetermined threshold in determining how many pixels are to be in a corresponding set of pixels. A predetermined threshold may be referred to, depending on the implementation and use of the predetermined threshold, as a predetermined minimum or a predetermined maximum. A predetermined threshold may serve as a stopping point in various implementations.

Goodness or quality metrics may vary. Further, the described SAD may be used for spatial domains, and the described difference-of-pixels may be used for temporal domains.

Implementations need not do motion estimation. Such implementations may assume zero motion in determining pred[j], for example.

According to a further implementation, determining a corresponding set of pixels includes selecting a pixel among a set of candidate pixels from the set of reference images, computing a quality metric for the selected candidate pixel, adding the candidate pixel to the corresponding set of pixels if the quality metric satisfies one or more predetermined criteria, and repeating said selecting, computing and adding until one or more stopping criteria are met.

In accordance with various implementations, a quality metric can be, for example: 1) the color difference between a pixel and a selected candidate pixel; 2) the sum of absolute differences between a M×N block around a pixel and a M×N block around a candidate pixel; or, 3) distance to the current pixel.

In a further implementation, computing a substitute value can include: 1) averaging the values of the pixels in the corresponding set of pixels; and/or 2) a weighted average of the values of the pixels in the corresponding set of pixels. In this implementation, the pixels are weighted in the corresponding set of pixels based on the value of the quality metric of each pixel. The averaging performed by the determination unit can be performed on the Y, U and V values (or another separation of colors) of the pixels separately.

In another implementation, each color component of each pixel is independently processed, and the number of pixels in the corresponding set of pixels is used as a stopping criterion.

In yet further implementations, an apparatus for filtering video includes a selector to select, for each of multiple pixels from a target digital image, pixels for possible inclusion in a corresponding set of pixels, an evaluator for computing a goodness value of a selected pixel, a set control unit determining the corresponding set of pixels based on the computed goodness value, for at least one of the multiple pixels, and a determination unit to determine, for each of the multiple pixels, a corresponding substitute value based on values of the pixels in the corresponding set of pixels.

According to some other implementations, the selected pixels are contained in one or more digital images where the one or more digital images possibly include the target digital image. The set control unit can also determine the corresponding set based on predetermined criteria. The predetermined criteria for the set control unit include whether or not one or more pixels from the candidate set, considered in a predetermined order, should be included in the corresponding set. In addition, the control unit further includes stopping criteria for stopping processing of the pixels. In one implementation, the stopping criteria include determining whether a predetermined number of pixels have been included in the corresponding set. In another implementation, the stopping criteria include determining whether all pixels in the candidate set have been considered.

In further implementations, the set control unit controls the size of the corresponding sets such that each corresponding set includes N pixels, unless the stopping criterion is satisfied prior to including N pixels. Yet in a further implementation, the locations of the N pixels in one corresponding set (that corresponds to one pixel) are different from the locations of the N pixels in another corresponding set (that corresponds to another pixel).

The selection of the corresponding pixel set by the set control unit can include pixels from multiple domains. In addition, the selection of pixels can be performed, by way of example, in a spiral order of increasing distance. The distance can be, for example, a spatial distance in a spatial domain and/or distance in the temporal domain, such as, for example, the orders described with reference to FIG. 8.

According to yet further implementations, a method for adaptive video noise filtering includes accessing a target digital image that includes pixels, and determining, for each of multiple pixels from the target digital image, a corresponding set of pixels. The pixels in the corresponding sets of pixels are contained in two or more digital images, and the two or more digital images include the target digital image and another reference digital image. For at least one of the multiple pixels, determining the corresponding set includes computing a quality metric of a pixel, and including the pixel in the corresponding set based on a result of the computed quality metric. For each of the multiple pixels, determining the corresponding set continues until N pixels are included in the corresponding set, unless a stopping criterion is satisfied prior to including N pixels. At this point, a corresponding substitute value is determined for each of the multiple pixels by averaging values of the pixels in the corresponding set of pixels.

According to yet another implementation, the evaluation pixel is one other than one of the multiple pixels, and the determining of the corresponding set further includes determining the corresponding set from a pool of candidate pixels that is larger than N.

In another implementation, computing a quality metric for each pixel can include performing a patch-based sum of absolute differences measure for temporally predicted candidates, and performing a pixel difference measure for spatially predicted candidates. The quality metric computation being adapted to assure that the amount of noise removed from substantially each pixel is substantially the same.

In yet a further implementation, a software carrier is provided having instructions for causing one or more devices to perform the following: 1) accessing a target digital image that includes pixels; 2) determining, for each of multiple pixels from the target digital image, a corresponding set of pixels; and 3) determining, for each of the multiple pixels, a corresponding substitute value based on averaging the values of the pixels in the corresponding set of pixels.

In another further implementation, the corresponding sets of pixels are contained in one or more digital images, where the one or more digital images possibly include the target digital image.

In another implementation, determining a corresponding set includes determining a goodness value of a pixel, and including the pixel in the corresponding set based on a result of the goodness value determination. In addition, determining the corresponding set includes, for each of the multiple pixels, continuing to determine the corresponding set until N pixels are included in the corresponding set, unless a stopping criterion is satisfied prior to including N pixels.

The implementations described include, for example, various systems and processes. Implementations may include one or more devices configured to perform one or more processes. A device may include, for example, discrete or integrated hardware, firmware, and software. A device may include, for example, a processor, which refers to processing devices in general, including, for example, a microprocessor, an integrated circuit, or a programmable logic device.

A device also may include one or more computer readable media having instructions for carrying out one or more processes. The computer readable medium may include, for example, a storage device such as, for example, a hard disk, a compact diskette, a random access memory ("RAM"), or a read-only memory ("ROM"). A computer readable medium also may include, for example, formatted electromagnetic waves encoding or transmitting instructions. Instructions may be, for example, in hardware, firmware, software, or in an electromagnetic wave. Instructions may be found in, for example, an operating system, a separate application, or a combination of the two. A processor may be characterized, therefore, as, for example, both a device configured to carry out a process and a device including computer readable media having instructions for carrying out a process.

It is to be understood that the present principles may be implemented in various forms of hardware, software, firmware, special purpose processors, or a combination thereof. Many implementations use a combination of hardware and software. Moreover, the software may be implemented as an application program tangibly embodied on a program storage device. The application program may be uploaded to, and executed by, a machine comprising any suitable architecture. The machine may be implemented on a computer platform having hardware such as one or more central processing units (CPU), a random access memory (RAM), and input/output (I/O) interface(s). The computer platform also may include an operating system and microinstruction code. The various processes and functions described herein may be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present principles.

While there has been shown, described, and pointed out fundamental novel features as applied to particular implementations, it will be understood that various omissions, substitutions, and changes in the form and details of the methods described and devices illustrated, and in their operation, may be made by those skilled in the art. For example, it is expressly intended that all combinations of those elements and/or method operations which perform substantially the same function in substantially the same way to achieve the same results are within the scope of the present principles. Moreover, it should be recognized that structures and/or elements and/or method steps shown and/or described in connection with any disclosed form or implementation of the present principles may generally be incorporated in any other disclosed, described, or suggested form or implementation. Further, elements of different implementations may be combined, supplemented, modified, or removed to produce other implementations. Accordingly, other implementations are within the scope of the following claims.

The invention claimed is:

1. A processor implemented method comprising:
   selecting a first pixel from a target digital image;
   evaluating multiple candidate pixels, from multiple digital images, based on values of the multiple candidate pixels, wherein the multiple candidate pixels include candidate pixels from at least two different domains;
   determining, for the first selected pixel, whether to include a candidate pixel from the multiple candidate pixels in a first corresponding set of pixels based on (i) the evaluation of the candidate pixel and (ii) whether a threshold number of pixels have been included in the first corresponding set; and
   determining, for the first selected pixel, a substitute value based on the values of the pixels in the first corresponding set of pixels.

2. The method of claim 1, further comprising:
   selecting a second pixel from the target digital image;
   evaluating a second set of multiple candidate pixels, from multiple digital images, based on values of the second set of multiple candidate pixels;
   determining, for the second selected pixel, whether to include a candidate pixel from the second set of multiple candidate pixels in a second corresponding set of pixels based on (i) the evaluation of the candidate pixel from the second set of multiple candidate pixels and (ii) whether the threshold number of pixels have been included in the second corresponding set; and
   determining, for the second selected pixel, a substitute value based on the values of the pixels in the second corresponding set of pixels.

3. The method of claim 1, wherein:
   determining the first corresponding set of pixels comprises including one or more candidate pixels from each of the multiple digital images in the first corresponding set of pixels.

4. The method of claim 1, wherein:
   evaluating multiple candidate pixels comprises evaluating a candidate pixel from multiple domains, and
   determining the first corresponding set of pixels comprises including one or more candidate pixels from each of the multiple domains in the first corresponding set of pixels.

5. The method of claim 4, wherein the multiple domains include domains selected from the group consisting of spatial, temporal, and transform.

6. The method of claim 1, wherein:
   evaluating the multiple candidate pixels comprises:
      selecting a candidate pixel from the multiple candidate pixels; and
      computing a quality metric for the selected candidate pixel, and
   determining the first corresponding set of pixels comprises adding the selected candidate pixel to the first corresponding set of pixels if the quality metric satisfies one or more criteria.

7. The method of claim 6, wherein the quality metric comprises a color difference between a pixel and a selected candidate pixel.

8. The method of claim 6, wherein the quality metric comprises a sum of absolute differences between an M×N block around the selected first pixel and an M×N block around the selected candidate pixel.

9. The method of claim 1, wherein determining the substitute value comprises averaging the values of the pixels in the first corresponding set of pixels.

10. The method of claim 1, wherein determining the substitute value comprises determining a weighted average of the values of the pixels in the first corresponding set of pixels.

11. The method of claim 10, wherein determining the weighted average comprises weighting the pixels in the first corresponding set of pixels based on a value of the quality metric of each pixel.

12. The method of claim 6, wherein the quality metric is based on a distance to the selected first pixel.

13. The method of claim 1, wherein the order in which the multiple candidate pixels are evaluated is based on distance between the multiple candidate pixels and the selected first pixel.

14. The method of claim 1, wherein:
   the selected first pixel includes multiple components, and
   evaluating the multiple candidate pixels, determining the first corresponding set of pixels, and determining the substitute value are performed separately for each component of the selected first pixel.

15. The method of claim 14, wherein the components are Y, U, and V.

16. The method of claim 1 further comprising selecting the threshold number.

17. The method of claim 1 wherein determining the first corresponding set of pixels comprises including in the first corresponding set exactly the threshold number of pixels.

18. An apparatus comprising:
   a selector configured to select, for a target pixel from a target digital image, pixels from multiple digital images for possible inclusion in a corresponding set of pixels, wherein the pixels include pixels from at least two different domains;
   an evaluator configured to compute a quality metric for the selected pixels;
   a control unit configured to determine whether to include a candidate pixel from the selected pixels in the corresponding set of pixels based on (1) the computed quality metric for the candidate pixel from the selected pixels, and (2) whether a threshold number of pixels have been included in the corresponding set; and a determination unit configured to determine for the target pixel a substitute value based on values of the pixels in the corresponding set of pixels.

19. The apparatus of claim 18, wherein:

the apparatus is configured to determine a second corresponding set of pixels for a second target pixel, and one or more of the locations of the pixels in the corresponding set of pixels, that corresponds to the target pixel, is different from the locations of the pixels in the second corresponding set, that corresponds to the second target pixel.

20. The apparatus of claim 18, wherein the selection of pixels for possible inclusion in the corresponding set of pixels occurs in a spiral order of increasing distance from the target pixel.

21. The apparatus of claim 20, wherein the distance comprises a spatial distance in a spatial domain and a temporal distance in a temporal domain.

22. The apparatus of claim 18, further comprising a user input unit configured to accept the threshold number from a user.

23. The apparatus of claim 18, wherein the control unit is configured to include pixels from multiple digital images in the corresponding set of pixels.

24. The apparatus of claim 18, wherein the control unit is configured to control the size of the corresponding set of pixels such that the corresponding set of pixels includes the threshold number of pixels, unless a stopping criterion is satisfied prior to including the threshold number of pixels.

25. An apparatus comprising:

means for selecting a first pixel from a target digital image;

means for evaluating multiple candidate pixels, from multiple digital images, based on values of the multiple candidate pixels, wherein the multiple candidate pixels include candidate pixels from at least two different domains;

means for determining, for the first selected pixel, whether to include a candidate pixel from the multiple candidate pixels in a first corresponding set of pixels based on (i) the evaluation of the candidate pixel and (ii) whether a threshold number of pixels have been included in the first corresponding set; and means for determining, for the first selected pixel, a substitute value based on the values of the pixels in the first corresponding set of pixels.

26. A non-transitory computer readable medium comprising instructions for causing one or more devices to perform the following:

selecting a first pixel from a target digital image;

evaluating multiple candidate pixels, from multiple digital images, based on values of the multiple candidate pixels, wherein the multiple candidate pixels include candidate pixels from at least two different domains;

determining, for the first selected pixel, whether to include a candidate pixel from the multiple candidate pixels in a first corresponding set of pixels based on (i) the evaluation of the candidate pixel and (ii) whether a threshold number of pixels have been included in the first corresponding set; and determining, for the first selected pixel, a substitute value based on the values of the pixels in the first corresponding set of pixels.

27. The method of claim 1, wherein the first corresponding set of pixels is determined such that the first corresponding set of pixels includes pixels from (1) a different spatial location in the target digital image and (2) a temporally different digital image.

28. The method of claim 1, wherein evaluating the multiple candidate pixels comprises determining luminance value of the multiple candidate pixels.

29. The method of claim 1, wherein said at least two different domains include a temporal domain and a spatial domain.

30. The method of claim 29, wherein said determining whether to include is performed over the candidate pixels from the temporal domain before it is performed over the candidate pixels from the spatial domain.

* * * * *